Nov. 23, 1926.　　　　　　　　　　　　　　　1,607,886
T. W. W. FORREST
METHOD OF TREATING RAISINS AND THE LIKE
Filed Jan. 12, 1925
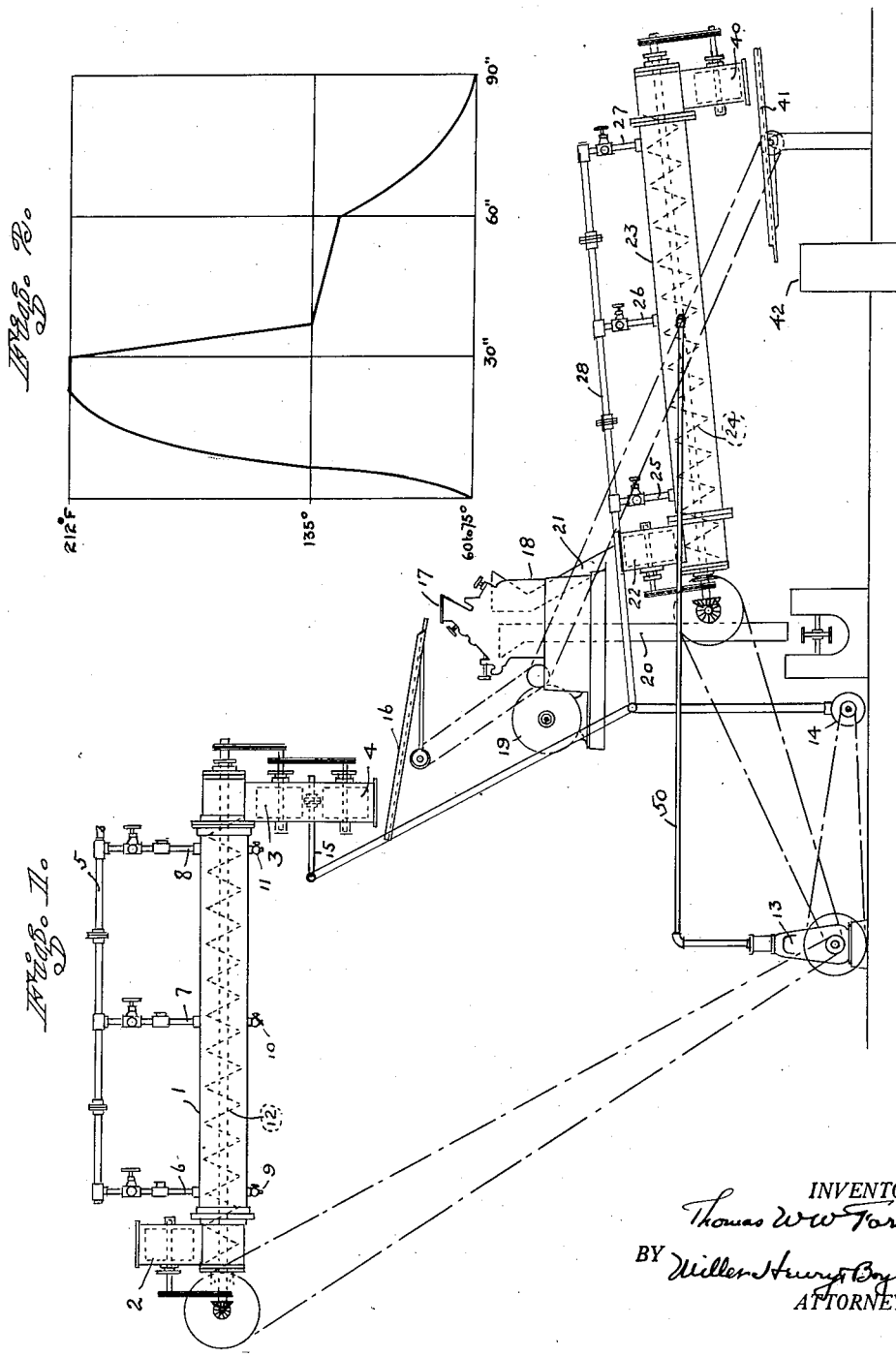
INVENTOR.
Thomas W W Forrest.
BY Miller Henry Boykin
ATTORNEYS.

Patented Nov. 23, 1926.

1,607,886

UNITED STATES PATENT OFFICE.

THOMAS W. W. FORREST, OF OAKLAND, CALIFORNIA, ASSIGNOR TO SUN MAID RAISIN GROWERS OF CALIFORNIA, OF FRESNO, CALIFORNIA, A COOPERATIVE ASSOCIATION OF CALIFORNIA.

METHOD OF TREATING RAISINS AND THE LIKE.

Application filed January 12, 1925. Serial No. 1,951.

My invention has for its object the method of treating raisins and the like, such as other similarly dried fruit, to retain the maximum food value and the organic constituents unimpaired, and to prepare the raisins with the most favorable marketing conditions of appearance and keeping qualities.

I have found that the best results are obtained where the surfaces of the raisins are brought to a relatively high temperature in the shortest space of time and are maintained under suitable conditions of moisture and temperature for a brief but sufficient period, to enable the skins to receive the requisite heat and moisture treatment without permitting the penetration of the raisin by the moisture and heat to any material extent, and as soon as the skins have received this treatment, to quickly cool the raisin and during said cooling to remove the seed therefrom.

After the seed removal, the cooling continues until substantially atmospheric conditions are attained. In this way the chemical constituents of the raisin or other fruit is best retained in its natural condition.

The color and appearance is also retained and the fruit units will freely flow, without gumming or sticking together.

While apparatus for carrying out the complete process as outlined above is shown in the accompanying drawings, the process only is claimed herein as the two main apparatus units together with the steps of the process pertaining to the units respectively are particularly described and claimed in my two copending applications filed under Serial Numbers 751,567 and 751,568 both filed November 22, 1924.

By referring to the accompanying drawings my invention will be made clear.

Fig. 1 illustrates apparatus for practising my process as especially applied to raisins.

Fig. 2 is a graphic showing of the temperature and time of treatment of the raisins throughout the several process steps.

The numeral 1 indicates a closed container having an inlet valve 2 and a pair of outlet valves 3, 4, arranged in tandem.

A conventional steam supply pipe is shown at 5 whereby steam is supplied to the container 1 through the connections at 6, 7, 8.

Drain or bleeeder valves are shown at 9, 10, 11 for abstracting any superfluous condensation and to insure the desired steam flow.

A conveyor is shown at 12 rotating in step with the valves 2, 3, 4 from any power means 13.

A vacuum pump is shown at 14 and a connection at 15 to remove the superfluous steam and commence the cooling of the raisins during their transit between the valves 3 and 4.

At 16 is a shaking table upon which the raisins are received from the valve 4 and distributed into the hopper 17 of the seeder 18 operated by the motor 19. The abstracted seeds are delivered through the shoot 20 and the seeded raisins fall through the shoot 21 and are passed by the inlet valve 22 into the conditioning chamber 23 through which they are transmitted by the conveyor 24. The heat is abstracted during the transit through the conditioner 23 by the application of cold dry air as through the pipe 50 and thereafter flows through the pipe connections at 25, 26, 27 and thence through the return pipe 28 to the vacuum machine at 14. The seeded raisins are then discharged through the valve 40 to the distributing table 41 and thence to the packing table 42.

The apparatus is timed and controlled for the treatment of raisins substantially in accordance with the curve shown in Fig. 2, the raisins entering the Pasteurizer at from 60° to 75° temperature, their skins or surface portions being rapidly raised in temperature to approximately 212° and there retained until approximately thirty seconds have elapsed from their entry through the valve 2. The surplus heat is then quickly abstracted during the passage of the raisins between the valves 3, 4 at which time the raisins drop to substantially 135° temperature and are then seeded and leave the seeder through the shoot 21 in substantially one minute from their entry into the valve 2. The remaining heat is then abstracted during the passage through the conditioner 23 until they are discharged on to the table 41 approximately 90 seconds from the time of their entry into the valve 2.

It will therefore be seen that the Pasteurizing step, the seeding step and the conditioning step each occupy successively a period of approximately 30 seconds during which the raisins have been heat and moisture treated, seeded, and brought back to room conditions of temperature and moisture without deterioration of the fleshy or meaty portions of the raisin.

I claim:

1. The method of preparing raisins and the like which consists of Pasteurizing the raisins by subjecting them to the action of heated aqueous vapor and thereafter subjecting the heated raisins to the action of cold dry air by which they are cooled and dried.

2. The method of preparing raisins and the like which consists of Pasteurizing the raisins by subjecting them to the action of hot steam for a period not to exceed thirty seconds and thereafter subjecting the heated raisins to the action of cold dry air by which they are cooled and dried.

3. The method of preparing raisins and the like which consists of Pasteurizing the raisins by subjecting the heated raisins to the action of a heated fluid then removing the seeds from the hot raisins and thereafter subjecting the heated raisins to the action of cold dry air by which they are cooled and dried.

4. The method of preparing raisins and the like which consists of Pasteurizing the raisins by subjecting them to the action of a heated fluid at a temperature of substantially 212° F. for a period not to exceed thirty seconds then removing the seeds from the hot raisins and thereafter subjecting the heated raisins to the action of cold dry air by which they are cooled and dried.

5. The method of preparing raisins and the like which consists of Pasteurizing the raisins by subjecting them to substantially 212° F. for a period of substantially thirty seconds then quickly cooling the raisins to a temperature below 150° F. then extracting the seeds from the still heated raisins, and then quickly reducing the raisins to atmospheric temperature by the action of cold dry air.

6. The process as set forth in claim 5 wherein the heated fluid is superheated steam.

7. The method of preparing raisins and the like which consists of Pasteurizing the raisins by subjecting them to substantially 212° F. for a period of substantially thirty seconds then quickly cooling the raisins to a temperature below 150° F. then distributing the raisins continuously and regularly to seeding apparatus, extracting the seeds from the still heated raisins, and then quickly reducing the raisins to atmospheric temperature by the action of cold dry air.

THOMAS W. W. FORREST.